United States Patent
Kondo

(10) Patent No.: US 9,604,675 B2
(45) Date of Patent: Mar. 28, 2017

(54) VEHICLE BODY FRONT PORTION STRUCTURE, AND VEHICLE BODY ASSEMBLY METHOD

(71) Applicant: HONDA MOTOR CO., LTD., Tokyo (JP)

(72) Inventor: Yuichi Kondo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/916,198

(22) PCT Filed: Sep. 4, 2014

(86) PCT No.: PCT/JP2014/073399
§ 371 (c)(1),
(2) Date: Mar. 3, 2016

(87) PCT Pub. No.: WO2015/034023
PCT Pub. Date: Mar. 12, 2015

(65) Prior Publication Data
US 2016/0194033 A1 Jul. 7, 2016

(30) Foreign Application Priority Data
Sep. 4, 2013 (JP) .................................. 2013-183475

(51) Int. Cl.
*B62D 25/08* (2006.01)
*B62D 27/02* (2006.01)
(Continued)

(52) U.S. Cl.
CPC .............. *B62D 25/08* (2013.01); *B23K 31/02* (2013.01); *B62D 25/04* (2013.01); *B62D 25/081* (2013.01); *B62D 27/02* (2013.01); *B62D 65/00* (2013.01)

(58) Field of Classification Search
CPC ...... B62D 25/04; B62D 25/08; B62D 25/081; B62D 25/082; B62D 25/14; B62D 27/02
(Continued)

(56) References Cited

U.S. PATENT DOCUMENTS 6,209,950 B1 * 4/2001 Hanyu .................. B62D 25/04
296/203.02
6,572,180 B2 * 6/2003 Kim ..................... B62D 25/081
296/203.02
(Continued)

FOREIGN PATENT DOCUMENTS

JP 10218028 A * 8/1998
JP 10-316025 12/1998
JP 2003312541 A * 11/2003

*Primary Examiner* — Jason S Daniels
(74) *Attorney, Agent, or Firm* — Rankin, Hill & Clark LLP

(57) ABSTRACT

Provided are a vehicle body front portion structure that enables an increase in vehicle body rigidity and strength while suppressing an increase in weight and a decrease in layout freedom, and a vehicle body assembly method. A vehicle body front portion structure (1) is provided with: a first weld portion (11) where a shield lower flange (4a) of a windshield lower (4) is abutted on a closed cross section of a front pillar (2), and where the shield lower flange (4a), an inner front flange (21a), and a rear end portion (5a) are spot-welded; and a second weld portion (12) where a general portion (5b) of a side member (5), a stiffener front flange (22a), and an outer front flange (3a) are spot-welded at a position forwardly of the first weld portion (11).

6 Claims, 12 Drawing Sheets

(51) Int. Cl.
*B62D 25/04* (2006.01)
*B23K 31/02* (2006.01)
*B62D 65/00* (2006.01)

(58) Field of Classification Search
USPC ............ 296/193.06, 193.09, 203.02, 203.03
See application file for complete search history.

(56) References Cited

U.S. PATENT DOCUMENTS

| | | | | |
|---|---|---|---|---|
| 7,140,674 | B2* | 11/2006 | Miyoshi ............... | B62D 25/082 296/193.05 |
| 2003/0146649 | A1* | 8/2003 | Kim ....................... | B62D 25/04 296/202 |
| 2013/0062911 | A1* | 3/2013 | Takeuchi ............. | B62D 25/082 296/203.02 |

* cited by examiner

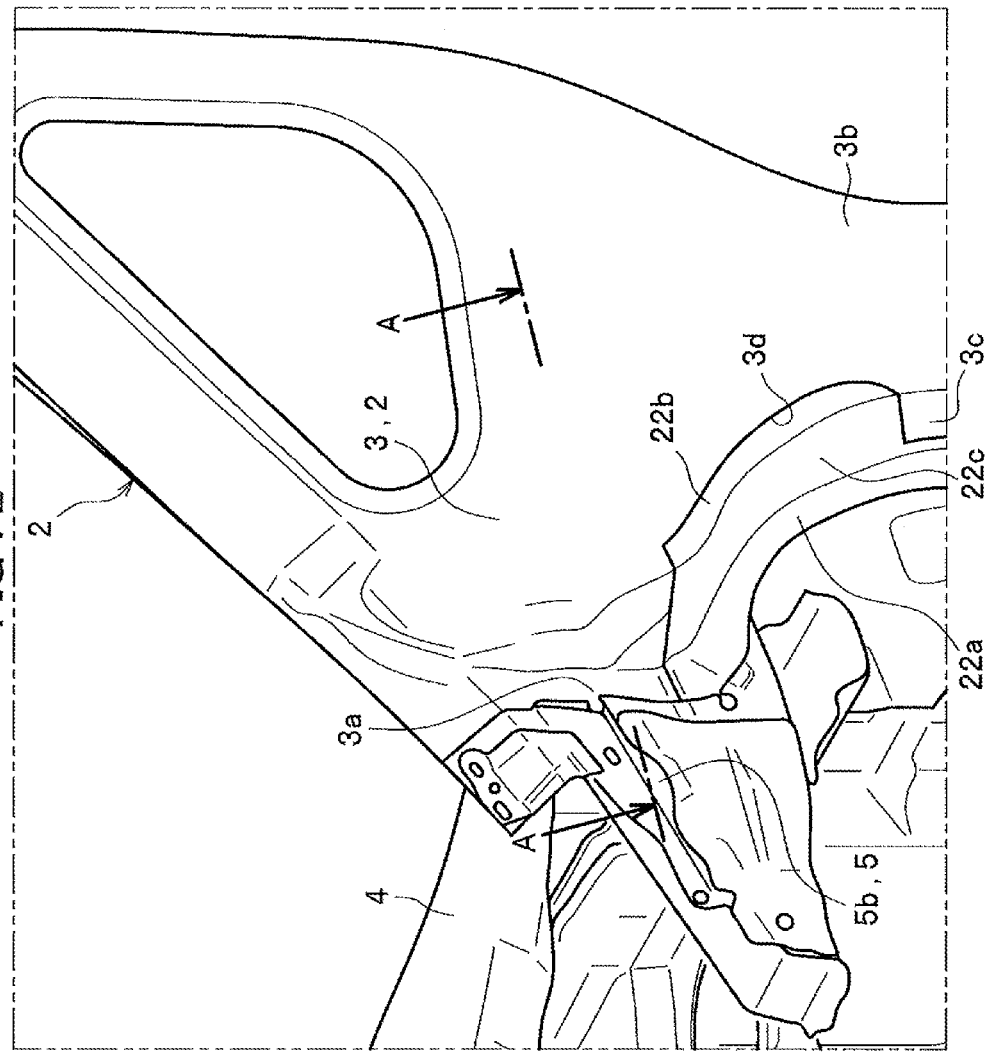
FIG. 2
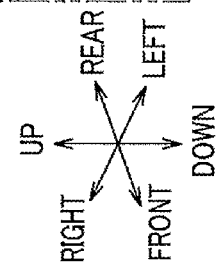

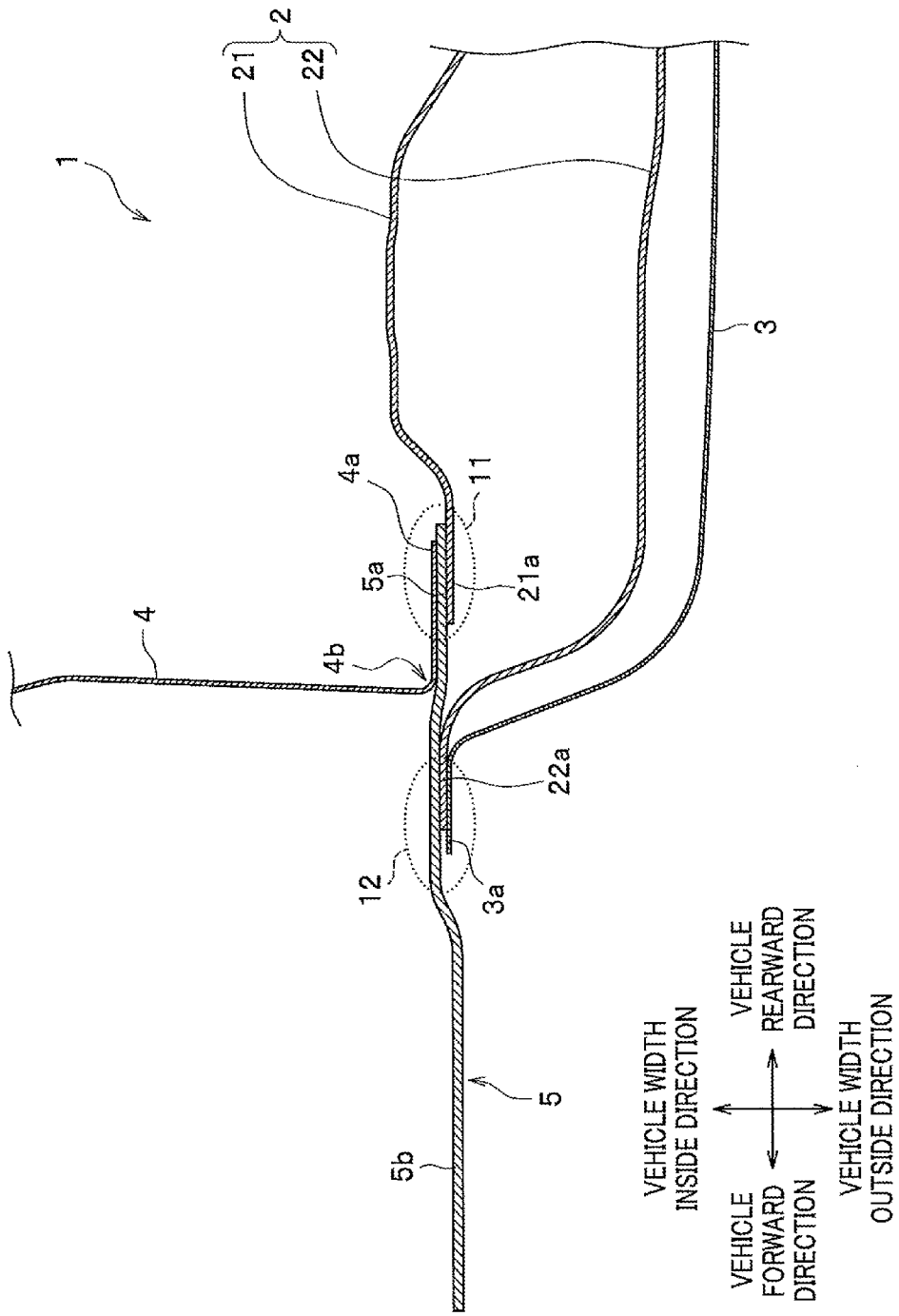

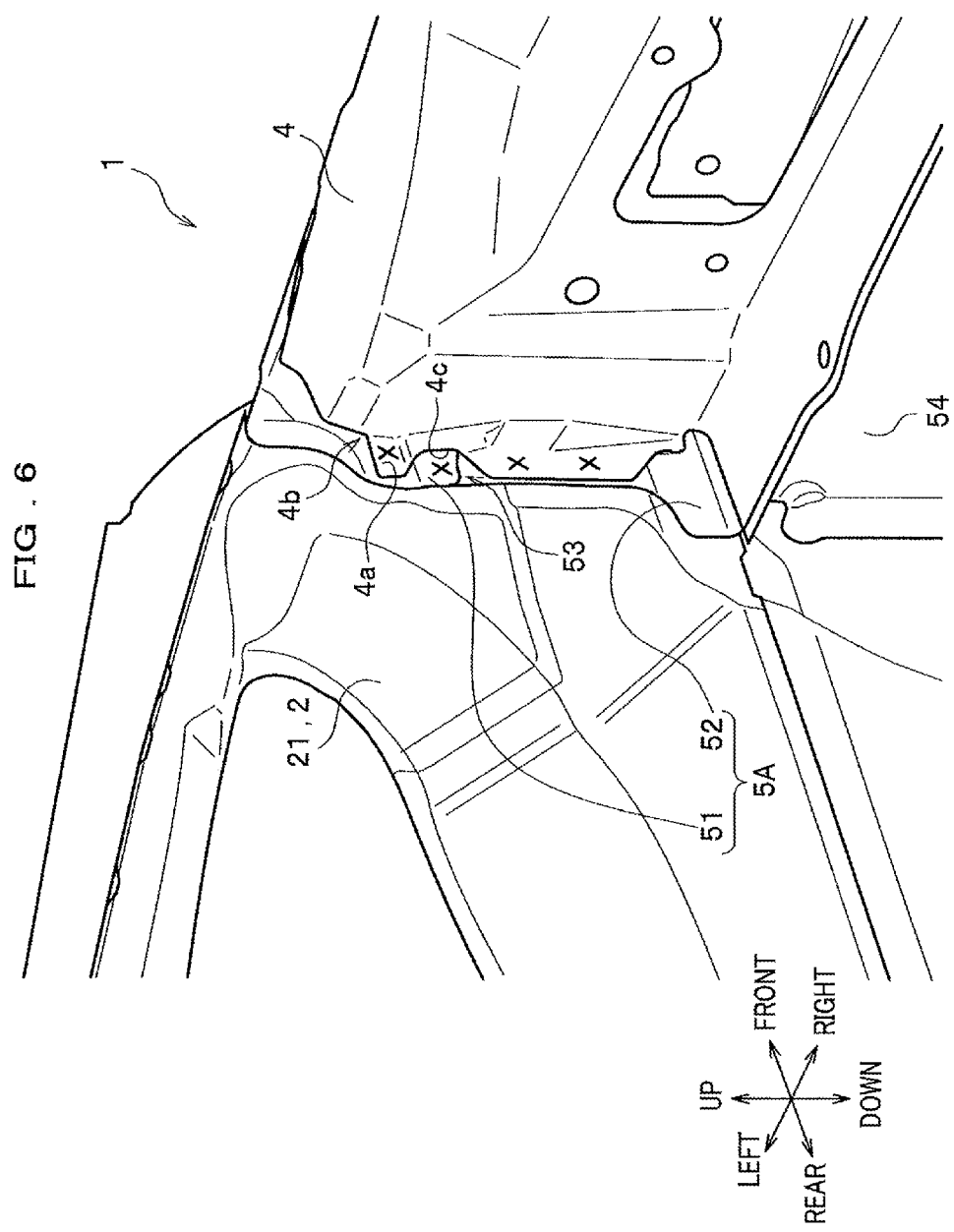

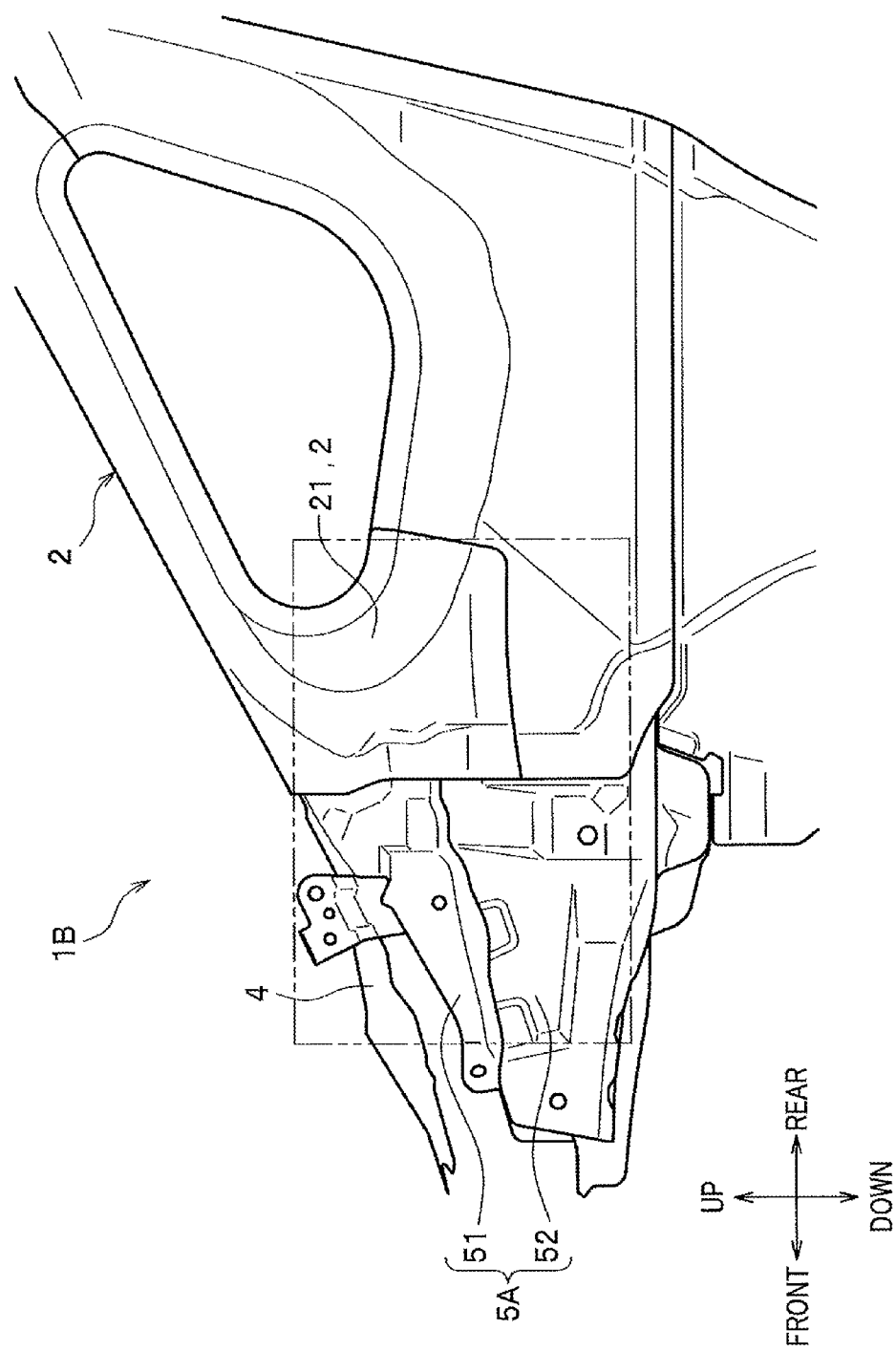

FIG. 12
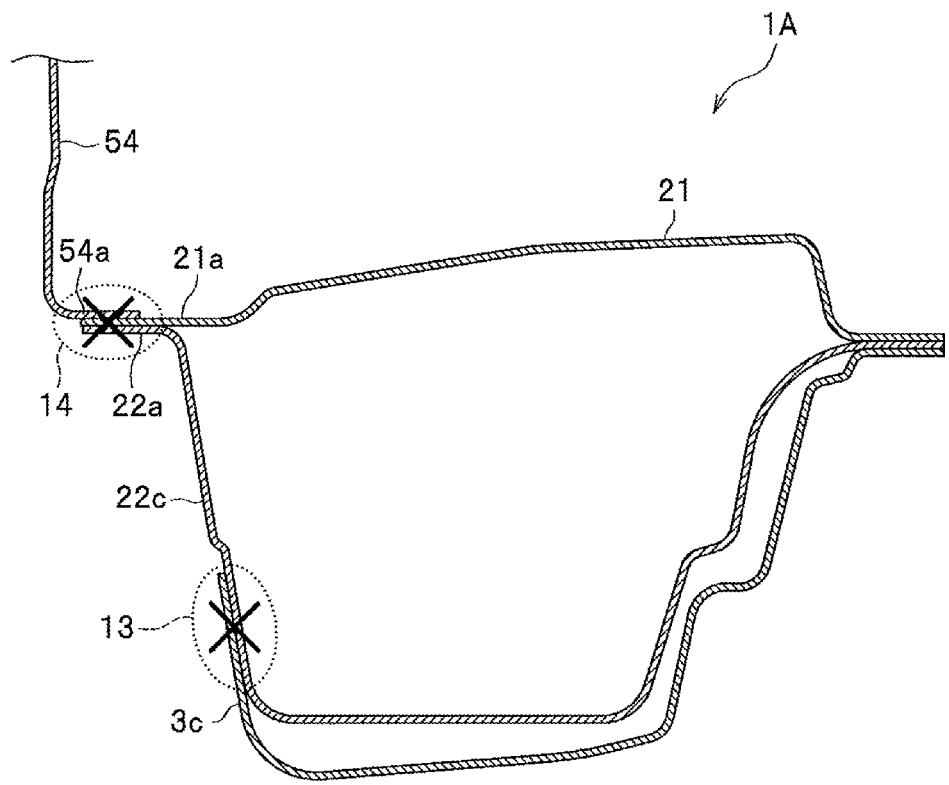
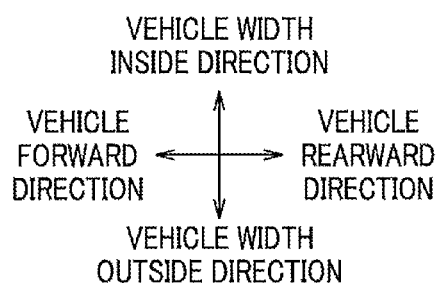

VEHICLE BODY FRONT PORTION STRUCTURE, AND VEHICLE BODY ASSEMBLY METHOD

TECHNICAL FIELD

The present invention relates to a vehicle body front portion structure provided with a windshield lower extending in a vehicle width direction between front pillars, and a vehicle body assembly method.

BACKGROUND ART

Conventionally, a vehicle width outer portion of a cowl and an instrument panel reinforcement are connected by a cowl side structure. Patent Document 1 describes a cowl side structure including a cowl reinforcement portion for forming a closed sectional structure extending in the vehicle width direction by a cowl reinforcement and a cowl over a dashboard panel, and a bracket for connecting the cowl reinforcement portion and a front pillar inner panel. In the cowl side structure described in Patent Document 1, the cowl and a vehicle width outer end portion of the cowl reinforcement are joined to a cowl side panel at a position offset forwardly of a vehicle body with respect to a closed cross section of the front pillar. A vehicle width inner end portion (front end portion) of the bracket is fastened to the cowl reinforcement portion with bolts, and a vehicle width outer end portion (rear end portion) of the bracket is fastened to nuts, which are attached in advance to a vehicle width outer surface of the front pillar inner panel, with bolts from inside in the vehicle width direction.

CITATION LIST

Patent Literature

Patent Document 1

Japanese Patent Application Publication No. H10-316025 (FIG. 1, FIG. 2)

SUMMARY OF INVENTION

Technical Problem

However, a conventional structure including the bracket for connecting the cowl reinforcement portion and the front pillar inner panel has the following problems.

(1) Since the cowl and the vehicle width outer end portion of the cowl reinforcement are joined to the cowl side panel at the position offset forwardly of the vehicle body with respect to the closed cross section of the front pillar, load transmission efficiency between the cowl and the front pillar is low.

(2) In order to improve the load transmission efficiency between the cowl and the front pillar, the cowl reinforcement portion overlapping with the front pillar in the vehicle width direction is provided, and the cowl reinforcement portion and the front pillar inner panel are connected by the bracket. Therefore, since the number of components is increased, weight of the vehicle body is increased.

(3) Further, layout freedom of other components is reduced by the cowl reinforcement portion and the bracket. Especially, effect on components built in the instrument panel behind the cowl is large.

(4) Further, in order to improve load transmission efficiency between the front pillar and the bracket, an end portion of the bracket is provided so as to overlap with the closed cross section of the front pillar in the vehicle width direction, and thus it is bolted because it cannot be spot-welded. Therefore, there is a problem that the number of components is further increased and assembly work is complicated.

The present invention has been made in view of these problems, and a purpose thereof is to provide a vehicle body front portion structure capable of increasing vehicle body rigidity and strength while suppressing an increase in weight and a decrease in layout freedom, and a vehicle body assembly method.

Solution to Problem

In order to solve the above problems, a vehicle body front portion structure is characterized by including: a front pillar which is provided in a pair on left and right sides to extend in a vertical direction in a vehicle body front portion, and has a front pillar inner on a vehicle width inner side and a front pillar stiffener joined to a vehicle outer surface of the front pillar inner; an outer panel joined to a vehicle outer surface of the front pillar; a windshield lower extending in a vehicle width direction between the front pillars; and a side member extending forwardly from the front pillar to form a part of a closed cross section of the front pillar, wherein the windshield lower includes a shield lower flange at a vehicle width outer end portion thereof, wherein the front pillar inner includes an inner front flange formed at a front end thereof, wherein the side member includes a rear end portion which is spot-welded with the shield lower flange and the inner front flange to form a first weld portion, and a general portion extending forwardly from the rear end portion, wherein the front pillar stiffener includes a stiffener front flange in front of the first weld portion, wherein the outer panel includes an outer front flange in front of the first weld portion, and wherein the vehicle body front portion structure includes a second weld portion where the general portion of the side member, the stiffener front flange and the outer front flange are spot-welded at a position in front of the first weld portion.

With this configuration, since a part of the closed cross section of the front pillar is constituted by the side member in a vicinity of an attaching portion of the front pillar and the windshield lower, the shield lower flange of the windshield lower is spot-welded with the rear end portion of the side member and the inner front flange of the front pillar inner at a position behind the stiffener front flange of the front pillar stiffener. As a result, the shield lower flange of the windshield lower is joined toward the closed cross section of the front pillar. Thus, it is possible to improve load transmission efficiency between the front pillar and the windshield lower without providing another reinforcing member or the like. Therefore, it is possible to increase vehicle body rigidity and strength while suppressing an increase in weight and a decrease in layout freedom.

Further, since the first weld portion and the second weld portion are both spot-welded, it is possible to reduce the number of components and to simplify an assembly process as compared with bolting.

Furthermore, it is possible to form the second weld portion by spot welding the general portion of the side member, the stiffener front flange and the outer front flange at the position in front of the first weld portion where the inner front flange of the front pillar inner is welded. Further, since it is configured such that four members of the inner front flange, the stiffener front flange, the outer front flange and the side member are not overlapped with one another, it is possible to form both the first weld portion and the second weld portion by three-spot welding instead of four-spot welding. Thus, it is possible to suppress welding defects due to incomplete penetration of members, thereby ensuring desired joint strength.

Further, the vehicle body front portion structure is characterized in that the side member is divided laterally into a side member upper and a side member lower, and the shield lower flange is joined to the side member to straddle a divided portion in which the side member upper and the side member lower are overlapped with each other, and has a flange cutout portion over the divided portion.

With this configuration, by dividing the side member laterally, it is possible to respectively optimize thickness and quality of materials in the side member upper and the side member lower, thereby achieving both weight reduction and an increase in rigidity and strength.

Further, by the cutout portion formed in the shield lower flange, it is possible to prevent overlapping of the four pieces of the shield lower flange, the side member upper, the side member lower and the front pillar inner, thereby suppressing reduction of joint strength by avoiding four-spot welding.

Further, the vehicle body front portion structure is characterized in that a sealing member is provided in the divided portion behind the second weld portion.

With this configuration, when the divided portion is provided inside the outer panel, that is, in a space on a vehicle inner side, there is a possibility that water or sound enters from the divided portion, and thus it is possible to prevent the water and sound by applying a sealer to a basic position.

Further, the vehicle body front portion structure is characterized in that the front pillar stiffener has a stiffener side wall facing in the vehicle width direction, a stiffener front wall extending inwardly in the vehicle width direction from a front end of the stiffener side wall, and the stiffener front flange extending forwardly from the stiffener front wall, wherein the outer panel has an outer side wall facing in the vehicle width direction, an outer front wall extending inwardly in the vehicle width direction from a front end of the outer side wall, the outer front flange extending forwardly from the outer front wall, and an outer cutout portion for exposing the stiffener side wall by cutting out a portion of the outer front wall and the outer side wall, and wherein the vehicle body front portion structure includes an upper member, which is joined to an exposed portion of the stiffener side wall exposed by the outer cutout portion at a rear end thereof, and extends forwardly along the side member.

With this configuration, by matching shapes of the front flange, the front wall, the side wall of the outer, respectively to shapes of the front flange, the front wall, the side wall of the stiffener, it is possible to align ridges which are corner portions between the respective side walls and the front walls, thereby increasing rigidity and strength of the front pillar.

Further, by joining the upper member to the exposed portion of the stiffener side wall exposed by the outer cutout portion, the upper member is directly joined to a front pillar stiffener 22 formed in thickness and material having higher rigidity and strength, and thus it is possible to improve load transmission efficiency from the upper member to the front pillar, thereby increasing strength and rigidity of the vehicle body front portion.

Further, the vehicle body front portion structure is characterized by including a dashboard panel extending in the vehicle width direction between the front pillars below the windshield lower, wherein the dashboard panel includes a dash flange at a vehicle width outer end portion thereof, and wherein in an area lower than the outer cutout portion, the vehicle body front portion structure includes a third weld portion where the stiffener front wall and the outer front wall are spot-welded, and a fourth weld portion where the dash flange, the inner front flange and the stiffener front flange are spot-welded.

With this configuration, since the stiffener front wall and the outer front wall are welded in the third weld portion, it is not necessary that the outer front flange is overlapped and joined with the inner front flange and the stiffener front flange. Since it is configured such that four members of the dash flange, the inner front flange, the stiffener front flange and the outer front flange are not overlapped with one another, it is possible to form the fourth weld portion by three-spot welding instead of four-spot welding. Thus, it is possible to suppress welding defects due to incomplete penetration of members, thereby ensuring desired joint strength.

Further, a vehicle body assembly method, in a vehicle body front portion structure including: a front pillar which is provided in a pair on left and right sides to extend in a vertical direction in a vehicle body front portion, and has a front pillar inner on a vehicle width inner side and a front pillar stiffener joined to a vehicle outer surface of the front pillar inner; an outer panel joined to a vehicle outer surface of the front pillar; a windshield lower extending in a vehicle width direction between the front pillars; and a side member extending forwardly from the front pillar to form a part of a closed cross section of the front pillar, wherein the windshield lower includes a shield lower flange at a vehicle width outer end portion thereof, wherein the front pillar inner includes an inner front flange formed at a front end thereof, and wherein the vehicle body front portion structure is assembled by a first welding step and a second welding step, the first welding step in which a first weld portion is formed by spot welding the shield lower flange, the inner front flange, and a rear end portion of the side member, wherein the front pillar stiffener includes a stiffener front flange in front of the first weld portion, and the outer panel includes an outer front flange in front of the first weld portion, and the second welding step in which a second weld portion is formed by spot welding a general portion of the side member, the stiffener front flange and the outer front flange, at a position in front of the first weld portion.

With this method, the vehicle width outer end portion of the windshield lower can be joined toward the closed cross section of the front pillar by spot welding, thereby improving load transmission efficiency between the front pillar and the windshield lower without providing another reinforcing member or the like. Therefore, it is possible to increase vehicle body rigidity and strength while suppressing an increase in weight and a decrease in layout freedom.

Further, since the first weld portion and the second weld portion are both spot-welded, it is possible to reduce the number of components and to simplify an assembly process as compared with bolting.

Furthermore, since it is configured such that the four members of the inner front flange, the stiffener front flange, the outer front flange and the side member are not overlapped with one another by welding the stiffener front flange of the front pillar stiffener and the outer front flange of the outer panel in front of the first weld portion where the inner front flange of the front pillar inner is welded, it is possible to form both the first weld portion and the second weld portion by three-spot welding instead of four-spot welding. Thus, it is possible to suppress welding defects due to incomplete penetration of members, thereby ensuring desired joint strength.

Advantageous Effects of Invention

According to the present invention, it is possible to provide a vehicle body front portion structure capable of increasing vehicle body rigidity and strength while suppressing an increase in weight and a decrease in layout freedom, and a vehicle body assembly method.

BRIEF DESCRIPTION OF DRAWINGS

FIG. 2 is an enlarged perspective view of the front pillar portion surrounded by a two-dot chain line in FIG. 1;

FIG. 3 is a cross-sectional view taken along a line A-A in FIG. 2;

FIG. 6 is a perspective view from the vehicle inner side of the front pillar portion on the left side of the vehicle body front portion structure according to the embodiment, after attaching the windshield lower;

FIG. 7 is a view from a vehicle width outer side of the front pillar portion on the left side of the vehicle body front portion structure according to the embodiment;

FIG. 12 is a cross-sectional view taken along a line B-B in FIG. 10.

DESCRIPTION OF EMBODIMENTS

Figure 1:
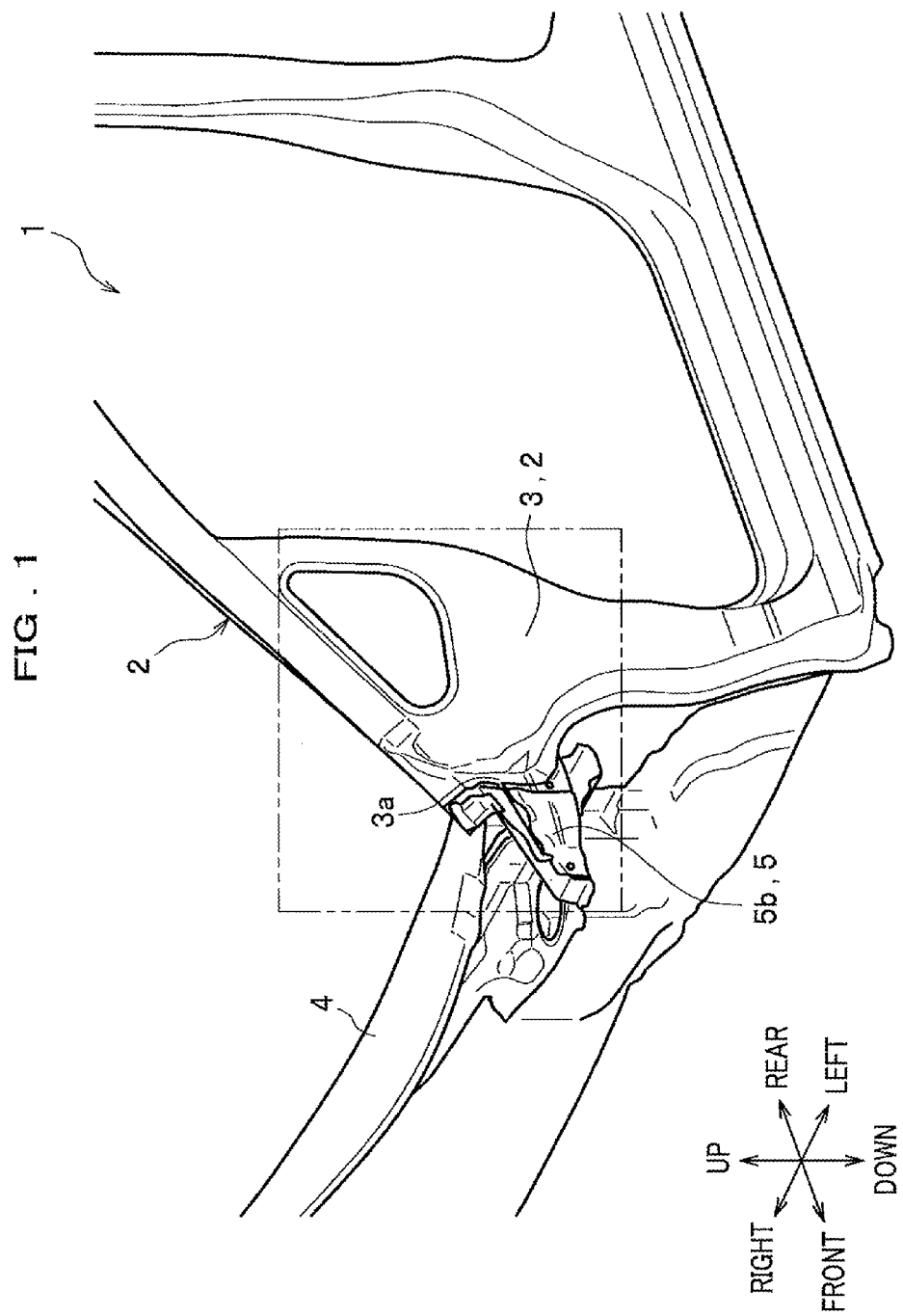
FIG. 1 is a perspective view from the left front of a front pillar portion on a left side of a vehicle body front portion structure according to an embodiment of the present invention.

Hereinafter, embodiments of the present invention will be described in detail with reference to the accompanying drawings.

Embodiment

An embodiment of the present invention will be described in detail with reference to FIGS. 1 to 3. The same components are denoted by the same reference numerals in the description, and duplicated description will be omitted. Further, when describing directions, they are described based on front, rear, left, right, up and down directions viewed from a driver of a vehicle. Note that, a vehicle width direction and a left-right direction are synonymous with each other.

FIG. 1 is a perspective view from the left front of a front pillar portion on a left side of a vehicle body front portion structure according to an embodiment of the present invention. FIG. 2 is an enlarged perspective view of the front pillar portion surrounded by a two-dot chain line in FIG. 1. FIG. 3 is a cross-sectional view taken along a line A-A in FIG. 2. Note that, since the vehicle body front portion structure according to the present embodiment has a left-right symmetric structure, a structure on one side of the vehicle will be described in the following description, and a structure on the other side of the vehicle will be omitted.

As shown in FIGS. 1 and 2, a vehicle including a vehicle body front portion structure 1 according to a first embodiment is, for example, a passenger car of FF (front engine front drive), FR (front engine rear drive) or four-wheel-drive. The vehicle body front portion structure 1 mainly includes a front pillar 2 which is provided in a pair on left and right sides to extend in a vertical direction in a vehicle body front portion, an outer panel 3 (see FIG. 3) joined to a vehicle outer surface of the front pillar 2, a windshield lower 4 extending in the vehicle width direction between the front pillars 2, and a side member 5 extending forwardly from the front pillar 2. The front pillar 2 and the outer panel 3 form a closed sectional structure extending in a vehicle up-down direction.

As shown in FIG. 3, the front pillar 2 has a front pillar inner 21 on a vehicle width inner side and a front pillar stiffener 22 joined to a vehicle outer surface of the front pillar inner 21. The front pillar inner 21 includes an inner front flange 21a formed at a front end thereof. As shown in FIG. 2, the front pillar stiffener 22 includes a stiffener front flange 22a extending toward the side member 5 in front of a first weld portion 11 (described below), a stiffener side wall 22b (an exposed portion) and a stiffener front wall 22c.

The outer panel 3 is a plate-like member integrally forming an outer surface of the vehicle body such as the front pillar 2, a roof side rail and a side sill. As shown in FIG. 3, the outer panel 3 includes an outer front flange 3a extending toward the side member 5 in front of the first weld portion 11 (described below).

As shown in FIG. 2, the outer panel 3 has an outer side wall 3b extending in a front-rear direction, an outer front wall 3c extending inwardly of the vehicle width direction from a front end of the outer side wall 3b, and an outer cutout portion 3d for exposing the stiffener side wall 22b by cutting out a portion of the outer side wall 3b and the outer front wall 3c.

The windshield lower 4 is a member for supporting a lower end portion of a front windshield (not shown). The windshield lower 4 is bridged between the left and right front pillars 2. The windshield lower 4 includes a shield lower flange 4a formed to be bent rearwardly of the vehicle at a vehicle width outer end portion 4b.

The side member 5 is a pair of left and right structure extending in the front-rear direction at an upper and vehicle outer side of a front side frame (not shown). The side member 5 includes a rear end portion 5a which is spot-welded with the shield lower flange 4a and the inner front flange 21a to form the first weld portion 11 (described below), and a general portion 5b extending forwardly from the rear end portion 5a. Incidentally, the side member 5 may be a structure which is divided into an upper member and a lower member. In this case, the lower member extends forwardly and downwardly from an intermediate portion in the front-rear direction of the upper member.

As shown in FIG. 3, the vehicle body front portion structure 1 is a structure in which the shield low flange 4a of the windshield lower 4 is brought into contact with the rear end portion 5a of the side member 5 constituting a part of a closed cross section of the front pillar 2 from a vehicle inner side, so that the shield low flange 4a is joined to the rear end portion 5a. As for joining of the windshield lower 4 with the side member 5 and the front pillar inner 21, bolting is not used, but spot welding capable of reducing the number of components and simplifying an assembly process is used.

Further, the vehicle body front portion structure 1 includes the first weld portion 11 where three pieces of the windshield lower 4, the front pillar inner 21 and the side member 5 are joined together, and a second weld portion 12 where three pieces of the outer panel 3, the front pillar stiffener 22, and the general portion 5b of the side member 5 are spot-welded at a position in front of the first weld portion 11.

Specifically, in the first weld portion 11, three pieces of the shield lower flange 4a of the windshield lower 4, the rear end portion 5a of the side member 5, and the inner front flange 21a of the front pillar inner 21 are overlapped in this order from the vehicle inner side, to be joined by spot welding. Further, in the second weld portion 12, three pieces of the general portion 5b of the side member 5, the stiffener front flange 22a of the front pillar stiffener 22, and the outer front flange 3a of the outer panel 3 are overlapped in this order from the vehicle inner side at the position in front of the first weld portion 11 (in the present embodiment, at a position further forward than a contact position of the windshield lower 4), to be joined by spot welding.

In this manner, the vehicle body front portion structure 1 is configured such that the shield lower flange 4a of the windshield lower 4 is in contact with the closed cross section of the front pillar 2, and the vehicle body front portion structure 1 includes the first weld portion 11 where the shield lower flange 4a of the windshield lower 4, the rear end portion 5a of the side member 5, and the inner front flange 21a (front end portion) of the front pillar inner 21 are spot-welded, and the second weld portion 12 where the general portion 5b of the side member 5, the stiffener front flange 22a of the front pillar stiffener 22, and the outer front flange 3a of the outer panel 3 are spot-welded at the position in front of the first weld portion 11. That is, the vehicle body front portion structure 1 has two weld portions of the first weld portion 11 where the shield lower flange 4a of the windshield lower 4 is brought into contact with the side member 5 and the front pillar inner 21, to be spot-welded, and the second weld portion 12 which is spot-welded at the position in front of the first weld portion 11. Therefore, in each of the first weld portion 11 and the second weld portion 12, the number of spot welding components is three or less, and thus it is possible to increase reinforcement strength.

Note that, a position of the second weld portion 12 is not limited to this, and it only have to be a forward position than the first weld portion 11 in an extending direction of the front pillar inner 21.

Figure 4A:
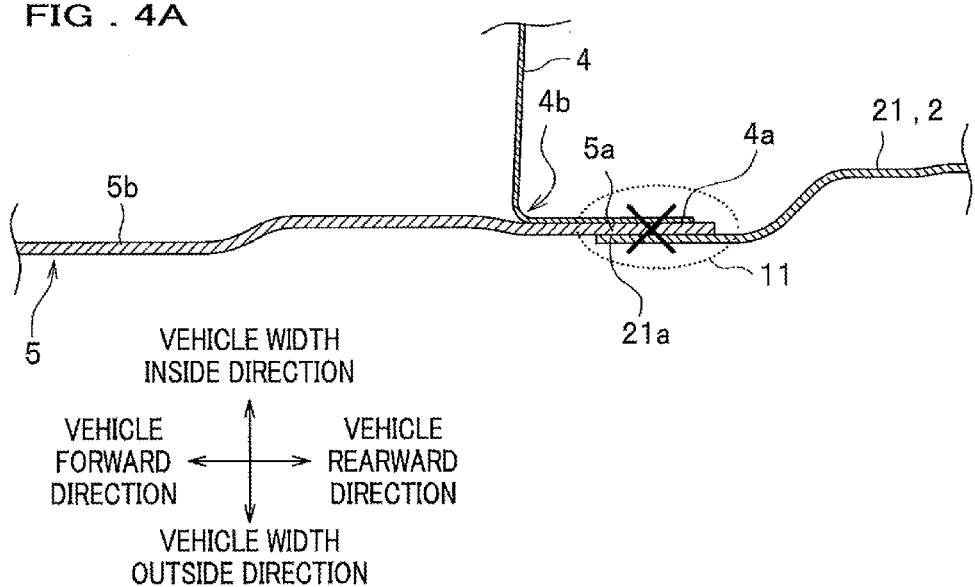
FIG. 4A is a view for explaining an assembly method of the vehicle body front portion structure according to the embodiment, and is a view of a first welding step in the assembly method.
Figure 4B:
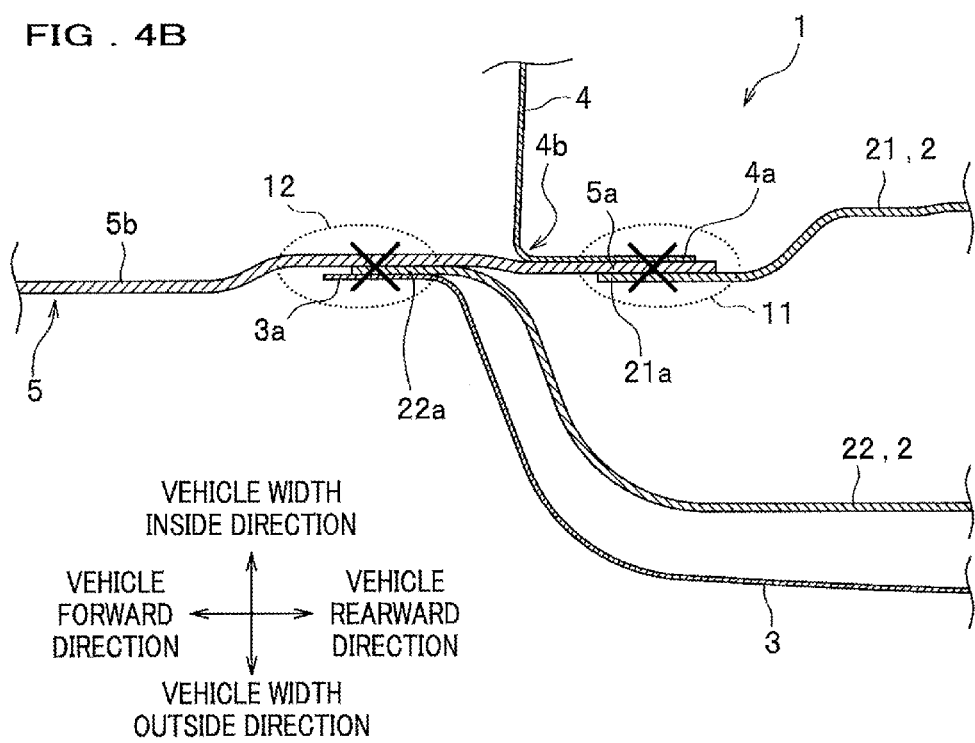
FIG. 4B is a view for explaining an assembly method of the vehicle body front portion structure according to the embodiment, and is a view of a second welding step in the assembly method.

Hereinafter, an assembly method of the vehicle body front portion structure 1 configured as described above will be described. FIGS. 4A and 4B are views for explaining the assembly method of the vehicle body front portion structure 1, and they respectively show a first welding step and a second welding step of the assembly method.

Preparation Step

Prepared are the front pillar 2 provided in a pair on left and right sides to extend in the vertical direction in the vehicle body front portion, the outer panel 3 joined to the vehicle outer surface of the front pillar 2, the windshield lower 4 extending in the vehicle width direction between the front pillars 2, and the side member 5 extending forwardly from the front pillar 2.

First Welding Step

As shown in FIG. 4A, in the first welding step, the shield lower flange 4a of the windshield lower 4, the rear end portion 5a of the side member 5, and the inner front flange 21a of the front pillar inner 21 are overlapped and spot-welded, to form the first weld portion 11. Note that, the spot welding is indicated by mark "x" in the drawing.

Second Welding Step

As shown in FIG. 4B, after completion of the first welding step in which three members of the windshield lower 4, the side member 5 and the front pillar inner 21 are spot-welded in the first weld portion 11, the outer panel 3 and the front pillar stiffener 22 are overlapped with the general portion 5b of the side member 5 from a vehicle width outer side. In the second welding step, the general portion 5b of the side member 5, the stiffener front flange 22a of the front pillar stiffener 22, and the outer front flange 3a of the outer panel 3 are overlapped and spot-welded, to form the second weld portion 12 at the position in front of the first weld portion 11. Thus, the assembly of the vehicle body front portion structure 1 is completed.

Operational effects of the assembly method of the vehicle body front portion structure 1 will be described. With the assembly method of the vehicle body front portion structure 1, since a part of the closed cross section of the front pillar 2 is constituted by the side member 5 in a vicinity of an attaching portion of the front pillar 2 and the windshield lower 4, the vehicle width outer end portion 4b of the windshield lower 4 can be joined toward the closed cross section of the front pillar 2 by spot welding. Thus, it is possible to improve load transmission efficiency between the front pillar 2 and the windshield lower 4 without providing another reinforcing member or the like. Therefore, it is possible to increase vehicle body rigidity and strength while suppressing an increase in weight and a decrease in layout freedom.

Further, since the first weld portion 11 and the second weld portion 12 are both spot-welded, it is possible to reduce the number of components and to simplify the assembly process as compared with bolting. For the same reason, it is possible to suppress welding defects due to incomplete penetration of members, thereby ensuring desired joint strength.

Configuration Example of Side Member

Figure 5:
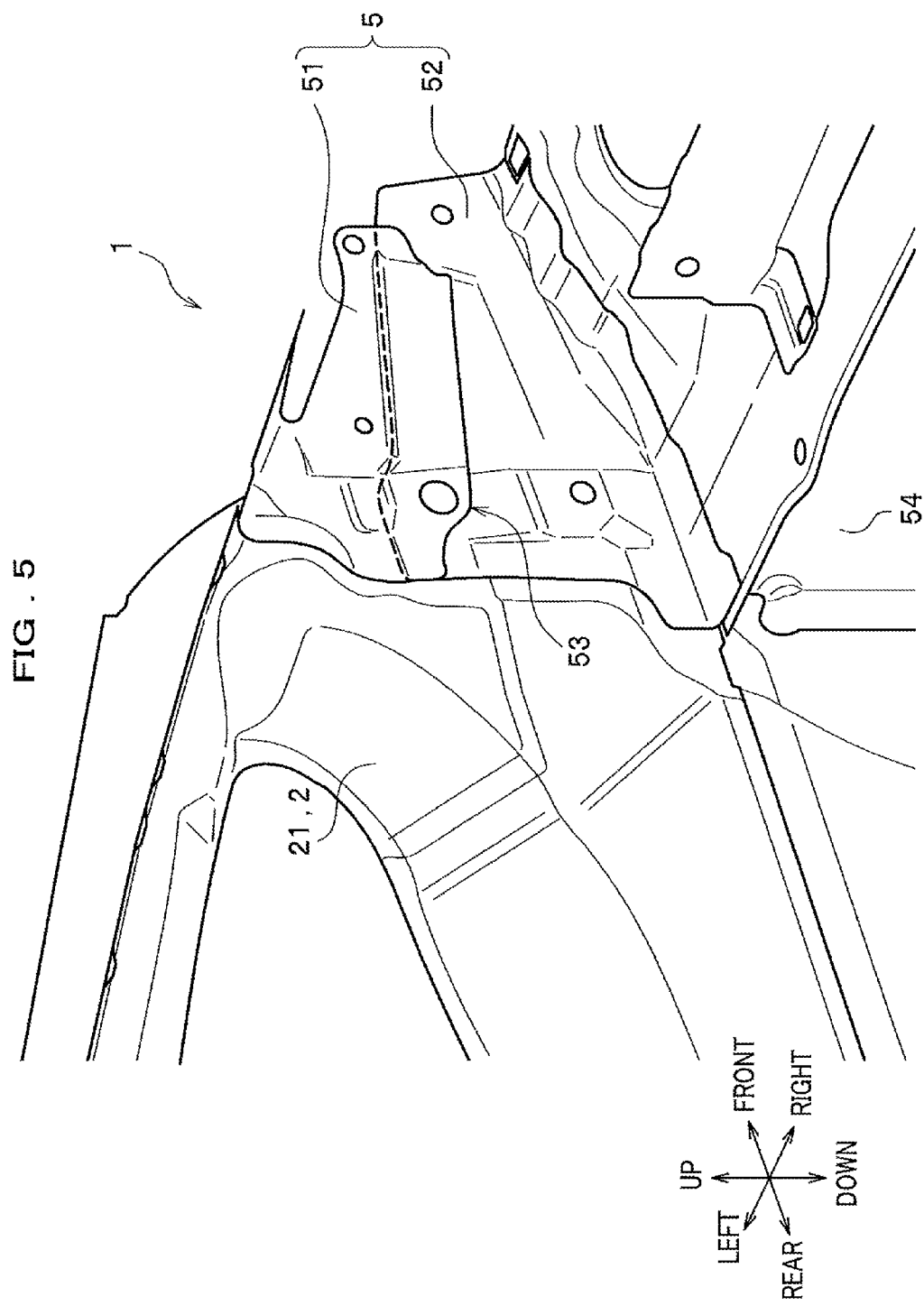
FIG. 5 is a perspective view from a vehicle inner side of the front pillar portion on the left side of the vehicle body front portion structure according to the embodiment, before attaching a windshield lower.

FIGS. 5 and 6 are perspective views from a vehicle inner side of the front pillar portion on the left side of the vehicle body front portion structure according to the present embodiment. FIG. 5 is the perspective view before attaching the windshield lower 4, and FIG. 6 is the perspective view after attaching the windshield lower 4.

As shown in FIGS. 5 and 6, the vehicle body front portion structure 1 includes the front pillar inner 21 provided in a pair on left and right sides to extend in the vertical direction in the vehicle body front portion, the windshield lower 4 (see FIG. 6) extending in the vehicle width direction between the front pillar inners 21, and the side member 5 extending forwardly from the front pillar inner 21.

As shown in FIG. 5, the side member 5 is composed of a side member upper 51 forming an upper portion of the side member 5 and a side member lower 52 forming a lower portion of the side member 5. A combined portion of the side member upper 51 and the side member lower 52 forms a divided portion 53. Further, a dashboard panel 54 is attached in the vehicle width direction below the windshield lower 4.

As indicated by a dashed line in FIG. 5, the divided portion 53 is a two pieces structure in which the side member upper 51 and the side member lower 52 are overlapped with each other.

The side member 5 can be divided laterally into the side member upper 51 and the side member lower 52. Further, the side member upper 51 has a joint portion (not shown) joined to an upper portion of the side member lower 52, and is joined to the upper portion of the side member lower 52 by the joint portion thereof. As indicated by mark "x" in FIG. 6, the side member upper 51 and the side member lower 52 are joined together in the divided portion 53, for example, by welding.

As shown in FIG. 6, the windshield lower 4 has a flange cutout portion 4c in the shield lower flange 4a. The flange cutout portion 4c is formed to straddle the divided portion 53 of the side member upper 51 and the side member lower 52. Therefore, the divided portion 53 is exposed from the flange cutout portion 4c of the shield lower flange 4a.

In the first welding step, the shield lower flange 4a is spot-welded to the side member 5A and the front pillar inner 21 to straddle the divided portion 53 in the flange cutout portion 4c. Therefore, as for the side member 5, three pieces of the side member upper 51, the side member lower 52 and the front pillar inner 21 are joined together in the flange cutout portion 4c. In addition, as indicated by mark "x" in FIG. 6, the side member 5 is spot-welded with the shield lower flange 4a in a portion other than the divided portion 53.

In this manner, the shield lower flange 4a has the flange cutout portion 4c for avoiding four-spot welding, and is joined to the side member 5 to straddle the divided portion 53 of the side member upper 51 and the side member lower 52. It is possible to prevent four pieces of the shield lower flange 4a, the side member upper 51, the side member lower 52 and the front pillar inner 21 from overlapping with one another by the flange cutout portion 4c, and to avoid four-spot welding, thereby suppressing a decrease in joint strength.

Therefore, when achieving both weight reduction and an increase in rigidity and strength by making a difference in thickness between the side member upper 51 and the side member lower 52, it is possible to avoid four-spot welding by providing the flange cutout portion 4c in the shield lower flange 4a of the windshield lower 4, thereby suppressing a decrease in joint strength.

Further, since the side member 5 is divided laterally into the side member upper 51 and the side member lower 52, it is possible to determine appropriate thickness and material in each member. For example, it is possible to change the thickness only in a necessary portion in view of the load transmission efficiency. As a result, it is possible to achieve both weight reduction and an increase in rigidity and strength.

Configuration Example of Front Pillar Stiffener

Figure 8A:
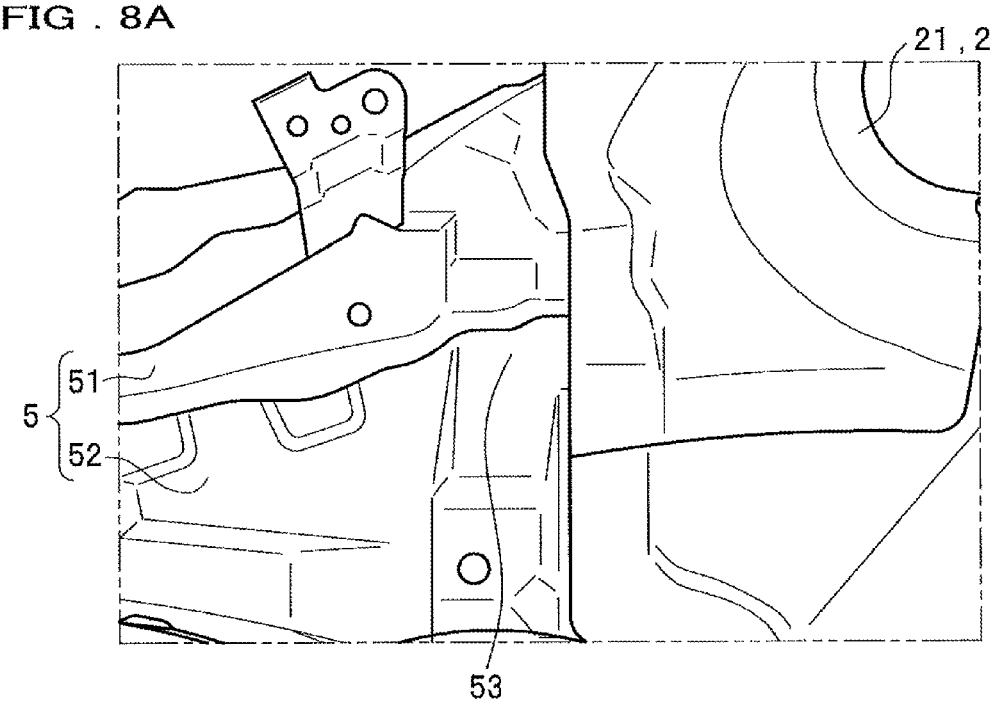
FIG. 8A is an enlarged view of the front pillar portion surrounded by a two-dot chain line in FIG. 7, and is a view before attaching a front pillar stiffener of the front pillar.
Figure 8B:
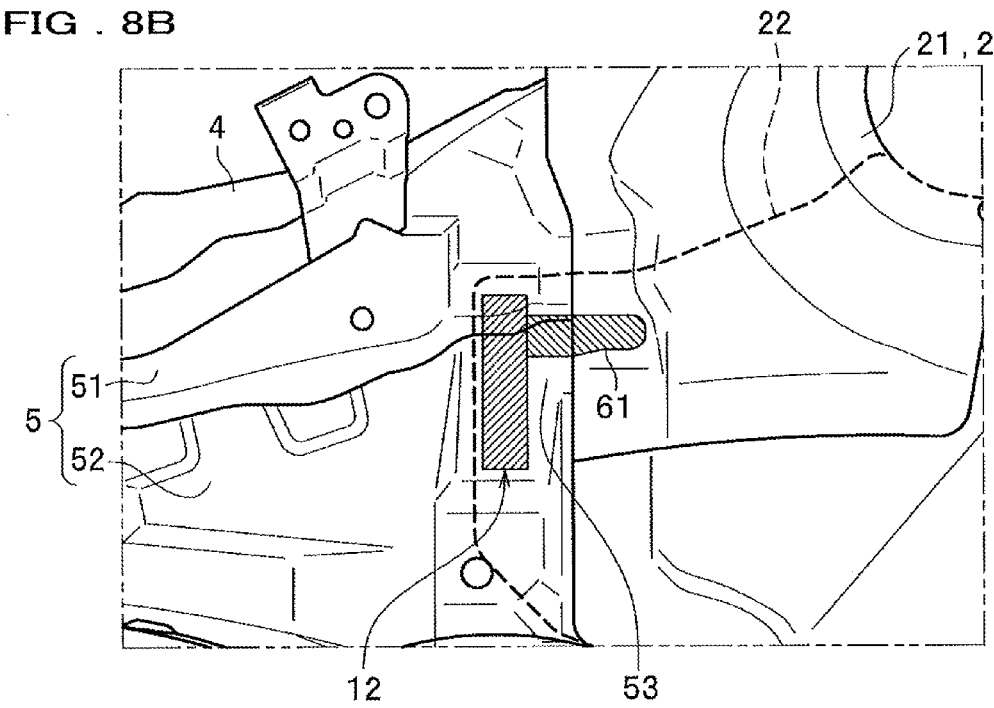
FIG. 8B is an enlarged view of the front pillar portion surrounded by the two-dot chain line in FIG. 7, and is a view after attaching the front pillar stiffener of the front pillar.

FIG. 7 is a view from the vehicle width outer side of the front pillar portion on the left side of the vehicle body front portion structure according to the present embodiment. FIGS. 8A and 8B are enlarged views of the front pillar portion surrounded by a two-dot chain line in FIG. 7; FIG. 8A is the enlarged view of the front pillar portion before attaching the front pillar stiffener 22; and FIG. 8B is the enlarged view of the front pillar portion after attaching the front pillar stiffener 22.

As shown in FIG. 7 and FIG. 8A, the side member 5 is divided laterally into the side member upper 51 and the side member lower 52, and the combined portion of the side member upper 51 and the side member lower 52 forms the divided portion 53.

As shown in FIG. 8B, in the vehicle body front portion structure 1, a sealing member 61 is provided over the divided portion 53 behind the second weld portion 12. The sealing member 61 seals a space between the front pillar stiffener 22 and the divided portion 53, for example, by sealer coating.

When the vehicle body front portion structure has the divided portion 53 inside the outer panel 3, that is, in a space on a vehicle inner side, there is a possibility that water or sound enters from the divided portion 53. In the present embodiment, the sealing member 61 is provided over the divided portion 53 behind the second weld portion 12, and a sealer is applied to the sealing member 61. Since the sealing member 61 is provided at a basic position, that is, over the divided portion 53 behind the second weld portion 12, and the sealer is applied to the basic position, it is possible to efficiently achieve waterproof and soundproof.

As described above, the vehicle body front portion structure 1 of the present embodiment includes: the front pillar 2 which is provided in a pair on left and right sides to extend in the vertical direction in the vehicle body front portion, and has the front pillar inner 21 on the vehicle width inner side and the front pillar stiffener 22 joined to the vehicle outer surface of the front pillar inner 21; the outer panel 3 joined to the vehicle outer surface of the front pillar 2; the windshield lower 4 extending in the vehicle width direction between the front pillars 2; and the side member 5 extending forwardly from the front pillar 2 to form a part of the closed cross section of the front pillar 2. The vehicle body front portion structure 1 includes: the first weld portion 11 where the shield lower flange 4a of the windshield lower 4 is in contact with the closed cross section of the front pillar 2, and where the shield lower flange 4a, an inner front flange 21a, and a rear end portion 5a are spot-welded; and the second weld portion 12 where the general portion 5b of the side member 5, the stiffener front flange 22a, and the outer front flange 3a are spot-welded at the position in front of the first weld portion 11.

With this configuration, the shield lower flange 4a of the wind shield lower 4 is spot-welded at a position behind the stiffener front flange 22a of the front pillar stiffener 22, and the vehicle width outer end portion 4b of the wind shield lower 4 is joined toward the closed cross section of the front pillar 2. Thus, it is possible to improve the load transmission efficiency between the front pillar 2 and the windshield lower 4 without providing another reinforcing member or the like. Therefore, it is possible to increase vehicle body rigidity and strength while suppressing an increase in weight and a decrease in layout freedom.

Further, since the first weld portion 11 and the second weld portion 12 are both spot-welded, it is possible to reduce the number of components and to simplify the assembly process as compared with bolting.

Further, the vehicle body front portion structure 1 includes the second weld portion 12 where the stiffener front flange 22a of the front pillar stiffener 22, and the outer front flange 3a of the outer panel 3 are spot-welded at the position in front of the first weld portion 11 where the inner front flange 21a of the front pillar inner 21 is spot-welded. Thus, it can be configured such that four members of the inner front flange 21a, the stiffener front flange 22a, the outer front flange 3a and the side member 5 are not overlapped with one another, and it is possible to form both the first weld portion 11 and the second weld portion 12 by three-spot welding instead of four-spot welding. Therefore, it is possible to suppress welding defects due to incomplete penetration of members, thereby ensuring desired joint strength.

Configuration of Upper Member and Example of Upper Member Mounting Structure

Figure 9:
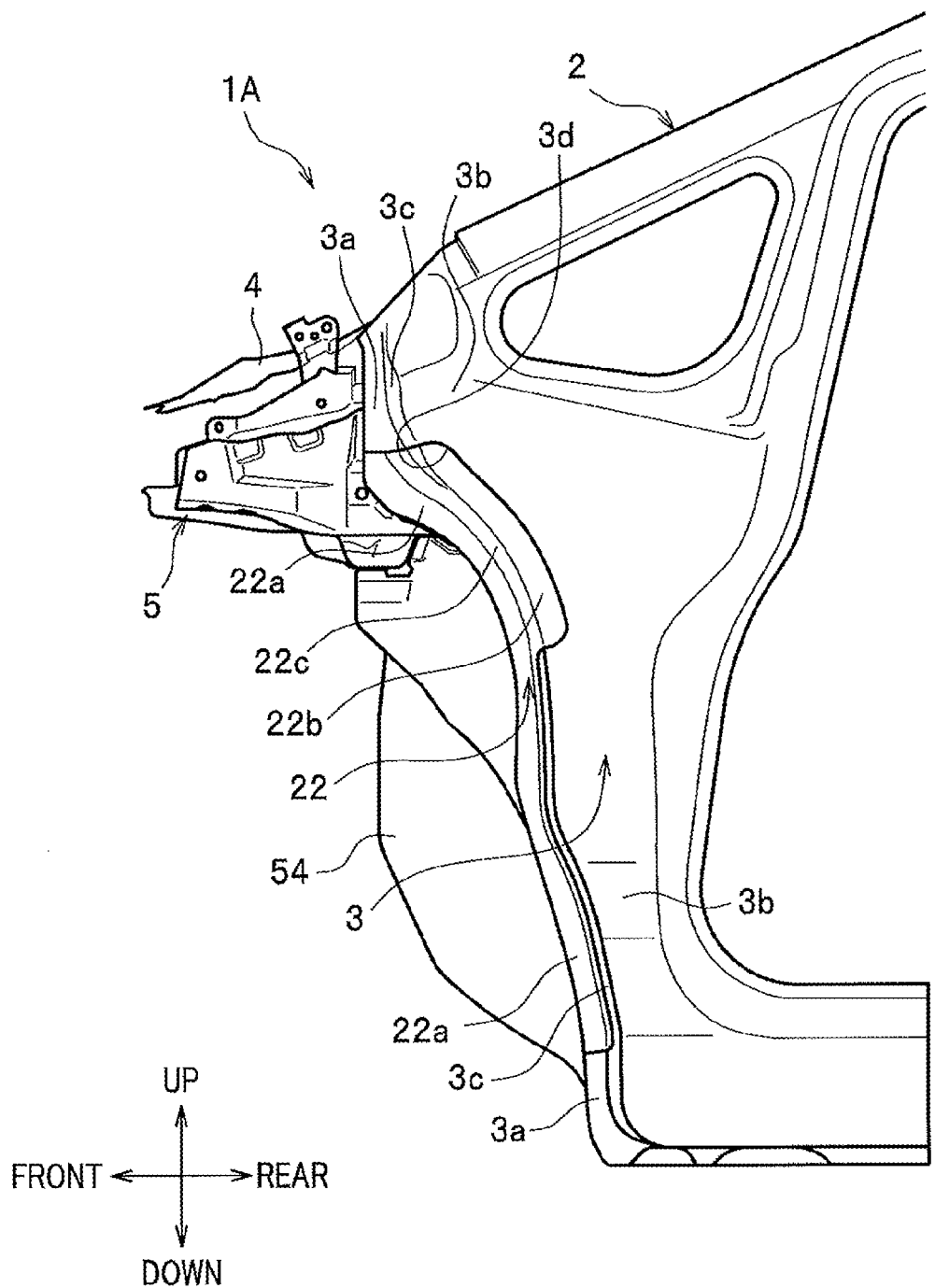
FIG. 9 is a view from the vehicle width outer side of the front pillar portion on the left side of a modification of the vehicle body front portion structure according to the embodiment, before attaching an upper member.
Figure 10:
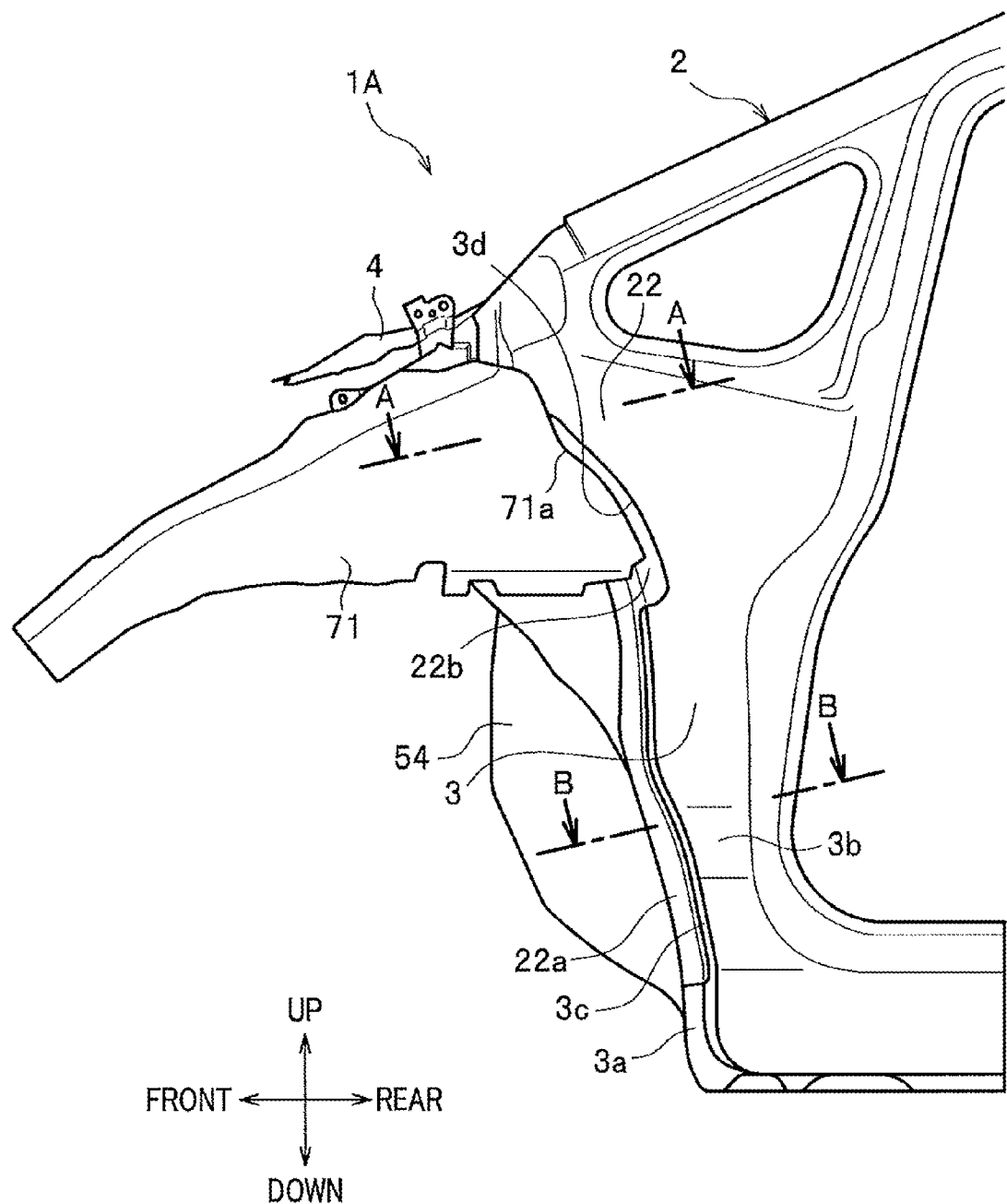
FIG. 10 is a view from the vehicle width outer side of the front pillar portion on the left side of the modification of the vehicle body front portion structure according to the embodiment, after attaching the upper member.
Figure 11:
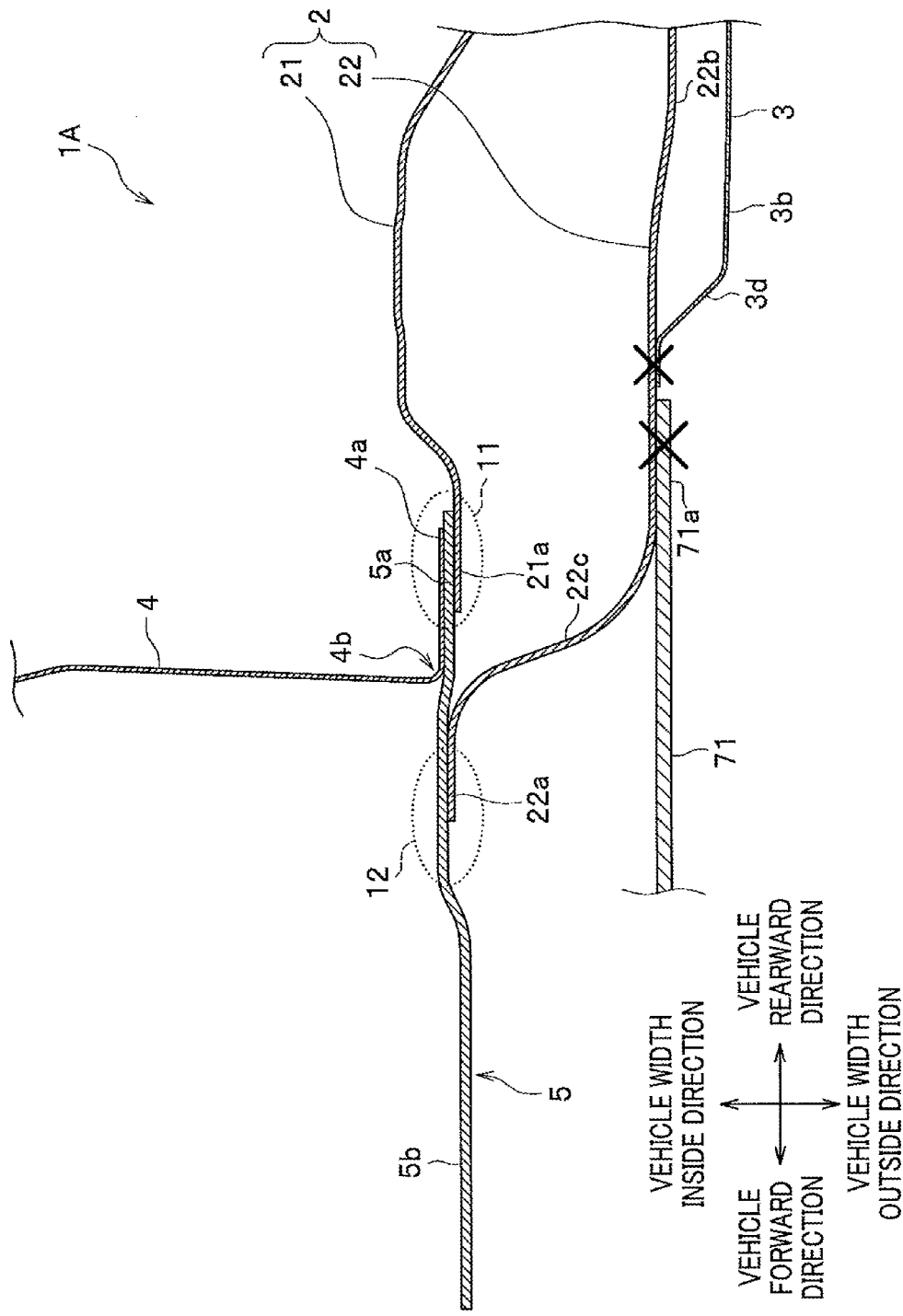
FIG. 11 is a cross-sectional view taken along a line A-A in FIG. 10.

FIGS. 9 and 10 are views from the vehicle width outer side of the front pillar portion on the left side of the vehicle body front portion structure according to the present embodiment; FIG. 9 is the view before attaching the upper member; and FIG. 10 is the view after attaching the upper member. FIG. 11 is a cross-sectional view taken along a line A-A in FIG. 10. FIG. 12 is a cross-sectional view taken along a line B-B in FIG. 10. The same components as FIGS. 1 to 3 are denoted by the same reference numerals, and duplicated description will be omitted. The vehicle body front portion structure 1A further includes an upper member 71 (see FIGS. 10 and 11) extending forwardly along the side member 5.

As shown in FIGS. 10 and 11, the front pillar stiffener 22 has the stiffener side wall 22b extending in the front-rear direction, the stiffener front wall 22c extending inwardly in the vehicle width direction from a front end of the stiffener side wall 22b, and the stiffener front flange 22a extending forwardly from the stiffener front wall 22c.

As shown in FIG. 11, the outer panel 3 has the outer side wall 3b extending in the front-rear direction, the outer front wall 3c extending inwardly in the vehicle width direction from a front end of the outer side wall 3b, the outer front flange 3a extending forwardly from the outer front wall 3c, and the outer cutout portion 3d for exposing the stiffener side wall 22b by cutting out a portion of the outer side wall 3b and the outer front wall 3c.

As shown in FIG. 11, the stiffener side wall 22b and the outer cutout portion 3d are joined by MIG welding, to form the exposed portion of the stiffener side wall 22b. The upper member 71 is a member extending in the front-rear direction on a vehicle outer side of the side member 5. The upper member 71 is joined by MIG welding to the exposed portion of the stiffener side wall 22b exposed by the outer cutout portion 3d at a rear end portion 71a thereof (see mark "x" in FIG. 11).

As shown in FIG. 12, the vehicle body front portion structure 1A includes the dashboard panel 54 extending in the vehicle width direction between the front pillars 2 below the windshield lower 4 (see FIG. 2). The dashboard panel 54 has a dash flange 54a at a vehicle width outer end portion thereof, and in a region below the outer cutout portion 3d, the vehicle body front portion structure 1A includes a third weld portion 13 where the stiffener front wall 22c and the outer front wall 3c are spot-welded, and a fourth weld portion 14 where the dash flange 54a, the inner front flange 21a and the stiffener front flange 22a are spot-welded.

With this configuration, since the stiffener front wall 22c and the outer front wall 3c are welded in the third weld portion 13, it is not necessary that the outer front flange 3a is overlapped and joined with the inner front flange 21a and the stiffener front flange 22a. Since it is configured such that four members of the dash flange 54a, the inner front flange 21a, the stiffener front flange 22a and the outer front flange 3a are not overlapped with one another, it is possible to form the fourth weld portion by three-spot welding instead of four-spot welding. Thus, it is possible to suppress welding defects due to incomplete penetration of members, thereby ensuring desired joint strength.

Further, by matching shapes of the outer front flange 3a, the outer front wall 3c and the outer side wall 3b of the outer panel 3, respectively to shapes of the stiffener front flange 22a, the stiffener front wall 22c and the stiffener side wall 22b of the front pillar stiffener 22, ridges which are corner portions between the respective side walls and the front walls are aligned with each other. Since the ridges of the outer panel 3 and the front pillar stiffener 22 are aligned with each other, it is possible to increase the rigidity and strength of the front pillar.

Further, by joining the rear end portion 71a of the upper member 71 to the exposed portion of the stiffener side wall 22b exposed by the outer cutout portion 3d, it is possible to obtain the following effects. That is, the outer panel 3 is a relatively large member in outer panel members, and there is a request for reducing its thickness as much as possible for weight reduction. In contrast, the front pillar stiffener 22 is formed in thickness and material having high rigidity and strength. In the present embodiment, since it is configured such that the upper member 71 is directly joined to the front pillar stiffener 22, and a load (front collision load) is directly transmitted from the upper member 71 to the front pillar stiffener 22, it is possible to improve load transmission efficiency from the upper member 71 to the front pillar stiffener 22, thereby increasing strength and rigidity of the vehicle body front portion.

The vehicle body front portion structure according to the embodiments has been described in detail with reference to the drawings hereinabove, however, the present invention is not limited to the embodiments, and it is needless to say that the embodiments can be suitably modified without departing from the scope and spirit of the present invention.

REFERENCE SIGNS LIST 1, 1A: vehicle body front portion structure
2: front pillar
3: outer panel
3a: outer front flange 3b: outer side wall
3c: outer front wall
3d: outer cutout portion
4: windshield lower
4a: shield lower flange
4b: vehicle width outer end portion
5: side member
5a: rear end portion
5b: general portion
11: first weld portion
12: second weld portion
13: third weld portion
14: fourth weld portion
21: front pillar inner
21a: inner front flange (front end portion)
22: front pillar stiffener
22a: stiffener front flange
22b: stiffener side wall
22c: stiffener front wall
51: side member upper
52: side member lower
53: divided portion
54: dashboard panel
54a: dash flange
61: sealing member
71: upper member
71a: rear end portion

The invention claimed is:

1. A vehicle body front portion structure comprising:
a front pillar which is provided in a pair on left and right sides to extend in a vertical direction in a vehicle body front portion, and has a front pillar inner on a vehicle width inner side and a front pillar stiffener joined to a vehicle outer surface of the front pillar inner;
an outer panel joined to a vehicle outer surface of the front pillar;
a windshield lower extending in a vehicle width direction between the front pillars; and
a side member extending forwardly from the front pillar to form a part of a closed cross section of the front pillar,
wherein the windshield lower comprises a shield lower flange at a vehicle width outer end portion thereof,
wherein the front pillar inner comprises an inner front flange formed at a front end thereof,
wherein the side member comprises a rear end portion which is spot-welded with the shield lower flange and the inner front flange to form a first weld portion, and a general portion extending forwardly from the rear end portion,
wherein the front pillar stiffener comprises a stiffener front flange in front of the first weld portion,
wherein the outer panel comprises an outer front flange in front of the first weld portion, and
wherein the vehicle body front portion structure comprises a second weld portion where the general portion of the side member, the stiffener front flange and the outer front flange are spot-welded at a position in front of the first weld portion.

2. The vehicle body front portion structure according to claim 1,
wherein the side member is divided laterally into a side member upper and a side member lower, and
wherein the shield lower flange is joined to the side member to straddle a divided portion in which the side member upper and the side member lower are overlapped with each other, and has a flange cutout portion over the divided portion.

3. The vehicle body front portion structure according to claim 2, wherein a sealing member is provided in the divided portion behind the second weld portion.

4. The vehicle body front portion structure according to claim 1,
wherein the front pillar stiffener has a stiffener side wall facing in the vehicle width direction, a stiffener front wall extending inwardly in the vehicle width direction from a front end of the stiffener side wall, and the stiffener front flange extending forwardly from the stiffener front wall,
wherein the outer panel has an outer side wall facing in the vehicle width direction, an outer front wall extending inwardly in the vehicle width direction from a front end of the outer side wall, the outer front flange extending forwardly from the outer front wall, and an outer cutout portion for exposing the stiffener side wall by cutting out a portion of the outer front wall and the outer side wall, and
wherein the vehicle body front portion structure comprises an upper member, which is joined to an exposed portion of the stiffener side wall exposed by the outer cutout portion at a rear end thereof, and extends forwardly along the side member.

5. The vehicle body front portion structure according to claim 4, comprising a dashboard panel extending in the vehicle width direction between the front pillars below the windshield lower,
wherein the dashboard panel comprises a dash flange at a vehicle width outer end portion thereof, and
wherein in an area lower than the outer cutout portion, the vehicle body front portion structure comprises a third weld portion where the stiffener front wall and the outer front wall are spot-welded, and a fourth weld portion where the dash flange, the inner front flange and the stiffener front flange are spot-welded.

6. A vehicle body assembly method, in a vehicle body front portion structure comprising:
a front pillar which is provided in a pair on left and right sides to extend in a vertical direction in a vehicle body front portion, and has a front pillar inner on a vehicle width inner side and a front pillar stiffener joined to a vehicle outer surface of the front pillar inner;
an outer panel joined to a vehicle outer surface of the front pillar;
a windshield lower extending in a vehicle width direction between the front pillars; and
a side member extending forwardly from the front pillar to form a part of a closed cross section of the front pillar,
wherein the windshield lower comprises a shield lower flange at a vehicle width outer end portion thereof,
wherein the front pillar inner comprises an inner front flange formed at a front end thereof, and
wherein the vehicle body front portion structure is assembled by a first welding step and a second welding step,
the first welding step in which a first weld portion is formed by spot welding the shield lower flange, the inner front flange, and a rear end portion of the side member,
wherein the front pillar stiffener comprises a stiffener front flange in front of the first weld portion, and the outer panel comprises an outer front flange in front of the first weld portion, and the second welding step in which a second weld portion is formed by spot welding a general portion of the side member, the stiffener front flange and the outer front flange, at a position in front of the first weld portion.

* * * * *